(12) United States Patent
Stroup et al.

(10) Patent No.: US 9,387,788 B1
(45) Date of Patent: Jul. 12, 2016

(54) COMBINATION TRAILER

(71) Applicant: FIRST CLASS SERVICES, INC., Lewisport, KY (US)

(72) Inventors: Randy D. Stroup, Lewisport, KY (US); Fred P. Smith, Alpine, UT (US); David Smith, Alpine, UT (US)

(73) Assignee: First Class Services, Inc., Lewisport, KY (US)

( * ) Notice: Subject to any disclaimer, the term of this patent is extended or adjusted under 35 U.S.C. 154(b) by 121 days.

(21) Appl. No.: 14/105,885

(22) Filed: Dec. 13, 2013

(51) Int. Cl.
*B60P 1/28* (2006.01)

(52) U.S. Cl.
CPC .......................................... *B60P 1/28* (2013.01)

(58) Field of Classification Search
CPC ............................... B62D 33/027; B60P 1/165
USPC ................................. 296/32, 10; 298/17.7, 18
See application file for complete search history.

(56) References Cited

U.S. PATENT DOCUMENTS

| | | | |
|---|---|---|---|
| 1,263,759 A | 4/1918 | Hanaway | |
| 1,538,384 A | 5/1925 | Crockett | |
| 1,613,273 A | 1/1927 | Hamilton | |
| 1,827,059 A | 10/1931 | Woolcott | |
| 1,863,957 A | 6/1932 | Woolcott | |
| 2,465,621 A | 3/1949 | Wheeler | |
| 3,168,345 A | 2/1965 | Roberts et al. | |
| 3,858,939 A * | 1/1975 | Bond et al. | 298/8 R |
| 4,252,363 A | 2/1981 | Rodrigue | |
| 4,711,484 A | 12/1987 | Tuerk | |
| 4,801,171 A | 1/1989 | Weaver | |
| 4,902,064 A | 2/1990 | Tuerk et al. | |
| 5,026,109 A | 6/1991 | Merlot, Jr. | |
| 5,080,423 A | 1/1992 | Merlot et al. | |
| 5,125,713 A | 6/1992 | Willingham et al. | |
| 5,829,842 A * | 11/1998 | Lombardo | 298/23 R |
| 6,062,801 A * | 5/2000 | Cooper | 414/470 |
| 6,142,554 A * | 11/2000 | Carroll et al. | 296/100.12 |
| 6,186,731 B1 * | 2/2001 | Vickers et al. | 414/519 |
| 6,250,233 B1 | 6/2001 | Luckring | |
| 6,371,565 B1 * | 4/2002 | Libhart | 298/11 |
| 6,382,731 B1 * | 5/2002 | Slutz et al. | 298/22 R |
| 6,581,999 B1 * | 6/2003 | Chapman | 296/26.04 |
| 6,626,498 B1 * | 9/2003 | Ostermeyer | 298/18 |
| 6,938,960 B1 * | 9/2005 | Eby | 298/23 C |
| 6,981,734 B2 | 1/2006 | Martin | |
| 7,210,726 B2 | 5/2007 | Merlot, Jr. et al. | |
| 7,296,842 B2 | 11/2007 | Growcock et al. | |
| 7,797,867 B2 | 9/2010 | Pulliam | |
| 8,220,859 B2 | 7/2012 | Reeder et al. | |
| 8,491,030 B2 | 7/2013 | Stroup et al. | |
| 2002/0033615 A1 | 3/2002 | Henning | |
| 2005/0248208 A1 * | 11/2005 | Boon | 298/18 |
| 2006/0202546 A1 * | 9/2006 | Baker et al. | 298/18 |
| 2014/0091611 A1 * | 4/2014 | Petrick | 298/22 R |

FOREIGN PATENT DOCUMENTS

CA         2026344 A        12/1999

* cited by examiner

*Primary Examiner* — H Gutman
(74) *Attorney, Agent, or Firm* — Stites & Harbison, PLLC; Terry L. Wright

(57) ABSTRACT

A combination trailer is provided that includes a dump trailer having a bottom surface, a front portion, a back portion, a first side panel, and a second side panel with an upper wall section and a lower wall section. The upper wall section is movable between an open and closed position such that the height of the second side panel is adjustable. An enclosure system is also included in the combination trailer to selectively cover an open top of the dump trailer.

26 Claims, 9 Drawing Sheets

COMBINATION TRAILER

TECHNICAL FIELD

The present invention relates to a combination trailer. In particular, the present invention relates to a combination trailer that includes a dump trailer and an enclosure system, where the dump trailer includes an upper wall section that is movable between a lowered, open position and a raised, closed position to facilitate the loading and unloading of various commodities.

BACKGROUND

In transporting commodities from one location to another with trailers, dump trailers are typically utilized to transport bulk commodities, such as sand, coal, and coke, and are typically made with a reduced overall height as compared to a van type trailer so that the dump trailers can be loaded over the side by a common front end loader. However, dump trailers are typically not utilized to transport general commodities as commodities must generally be loaded onto a dump trailer by "dumping" the commodities over the side of trailer. As such, flat bed or other similar trailers are often utilized to transport general commodities, and these commodities are then tied down to the trailer for transport. One problem with simply tying down a load of commodities to a trailer, however, is that the load is exposed to the weather, which can damage the commodities. Additionally, road debris or other foreign objects are commonly thrown into the air by the trucks pulling the trailer, or the wheels of the trailers themselves, and can further damage the commodities that are being transported.

Recognizing the deleterious effects that may result from tying a load to a flatbed trailer, various enclosure systems have been developed to protect the loads from the weather or from the debris that can strike the load in transit. Some of these enclosure systems have involved simple designs, such as a tarp that is merely tied over the load and used to provide a protective barrier for the commodities. Other enclosure systems, however, are considerably more detailed. For example, U.S. Pat. No. 4,711,484 describes a tarp cover system for flatbed trailers that makes use of a number of inverted U-shaped bow members that are longitudinally extendable and can be used to cover the entirety of the flat bed of a trailer. When a trailer equipped with such a tarp cover system is loaded, the U-shaped members and the tarp can be pulled into a collapsed position for loading and, subsequently, the U-shaped members and the tarp can then be expanded such that the enclosure system covers and protects the load in transit.

Despite the advantages that may be obtained by employing an enclosure system in a flatbed trailer, current enclosure systems are still not suitable for transporting bulk commodities. For instance, the tarp cover system described in U.S. Pat. No. 4,711,484 could not be used to carry a load of coal as the portion of the tarp cover system attached to the flatbed trailer and the tarp itself would not provide the required mechanical strength for carrying such a load. In this regard, there remains a need for a trailer that not only protects a load of commodities from the weather and various debris, but that also is capable of carrying bulk commodities, such as coal.

SUMMARY

The present invention is a combination trailer. In particular, the present invention is a combination trailer that includes a dump trailer and an enclosure system, where the dump trailer includes an upper wall section that is movable between a lowered, open position and a raised, closed position to facilitate the loading and unloading of various commodities.

In one exemplary embodiment, a combination trailer is provided that includes a dump trailer having a bottom surface, a first side panel, a second side panel opposite the first side panel, a front portion, a back portion opposite the front portion, and an open top, where the height of at least the first side panel, the second side panel, and the front portion are all substantially equal to one another. Furthermore, the combination trailer includes an enclosure system that is adapted to selectively cover the open top of the dump trailer.

The second side panel of the dump trailer of the exemplary combination trailer typically includes an upper wall section with a height that is about one-third of the entire height of the second side panel, and a lower wall section with a height that is about two-thirds the entire height of the second side panel. The upper wall section and the lower wall section are pivotally connected to one another along the length of the dump trailer such that the upper wall section can rotate approximately 180 degrees between a raised, closed position and an lowered, open position. In this regard, when the upper wall section is in the raised, closed position, the height of the second side panel is substantially equal to the height of the front portion, as indicated above. However, when the upper wall section is in the lowered, open position, the height of the second side panel is substantially equal to the height of the lower wall section and thus allows commodities to be easily loaded and unloaded over the second side panel of the dump trailer.

To facilitate the movement of the upper wall section between the open and closed positions, an actuator is operably connected to the front portion of the dump trailer and the upper wall section through the use of a linkage. Additionally, a plurality of stoppers are typically connected to the exterior surface of the lower wall section such that the upper wall section rests against the stoppers when the upper wall section is in the open position and thereby prevents the lower wall section and the upper wall section from colliding with and damaging each other during use of the combination trailer.

With further respect to the upper wall section of an exemplary combination trailer, the upper wall section is typically pivotally connected to the lower wall section by a plurality of hinges that are connected to the exterior surface of the upper wall section and to the exterior surface of the lower wall section. By positioning and connecting the hinges to the sections in such a manner, when the upper wall section is in the open position, the upper wall section and the lower wall section define a gap between the sections that prevents smaller pieces of bulk commodities, such as sand, coal, and coke, from becoming lodged or otherwise trapped between the upper wall section and lower wall section and then preventing the upper wall section from being moved into a closed position. To further prevent such a trapping of particles, the dump trailer also includes a first sloped surface extending along the bottom edge of the upper wall section and a second sloped surface extending along the top edge of the lower wall section so as to direct bulk commodities loaded onto the dump trailer to either collect in the interior of the trailer or fall away from the trailer and onto the ground. In these embodiments, a seal is also included and extends along the entire length of the first sloped surface to thereby seal the upper wall section and the lower wall section to one another to protect commodities from the elements or debris, while also preventing the commodities from becoming lodged between the upper wall section and the lower wall section, or from escaping the dump trailer, when the upper wall section is in the closed position.

To further seal the perimeter of the upper wall section when the upper wall section is in a closed position, the front portion of the dump trailer also includes a sealing surface that seals the upper wall section against the front portion. An overhang is also included on the front portion of the dump trailer and is positioned above the sealing surface such that, when the upper wall section is in the closed position, the overhang extends over the upper wall section to prevent precipitation or debris from entering the dump trailer.

To further obtain some of the benefits associated with both a dump trailer and a flatbed trailer covered by an enclosure system, the back portion of an exemplary combination trailer further includes a tailgate having height that is substantially equal to the height of the lower wall section of the dump trailer. In such embodiments, the tailgate is generally pivotally connected to at least one of the side panels and can rotate outward and away from the combination trailer. Additionally, a rear door cover can then be removably connected to the back portion of the dump trailer and extend from the top of the tailgate to the top of the back portion of the dump trailer to fully enclose the rear of the combination trailer, while still allowing for easy access to the interior of the trailer.

With respect to the enclosure system used in accordance with the combination trailers of the present invention, the enclosure system generally includes: a flexible tarp having a first edge attached to the first side panel and a second edge attached to a roller pipe; a plurality of brackets that are attached to the first side panel; and latching plates that are attached to the second side panel, the front portion of the dump trailer, and the back portion of the dump trailer. More specifically, in the stored position, the roller pipe is located adjacent to the first side panel, while, in the deployed position, the roller pipe and the flexible tarp extend over the open top of the trailer and can then be secured adjacent to the second side panel to fully cover the open top of the dump trailer.

To support the flexible tarp as it extends over the open top of the dump trailer, the enclosure system generally further includes a plurality of removable support members that extend from the first side panel to the upper wall section of the second side panel when the upper wall section is in the closed position. Then, to complete the enclosure system, the roller pipe and, consequently, the flexible tarp are connected to the dump trailer by a front latching plate connected to the front portion of the dump trailer, a middle latching plate connected to the upper wall section, and a back latching plate connected to the back portion of the dump trailer. The front, middle, and back latching plates are all substantially aligned when the upper wall section is in the closed position, and thus, are effectively used to connect the roller pipe to the dump trailer adjacent to the second side panel when the flexible tarp is extended over the support members and the open top of the dump trailer.

To move the roller pipe and the flexible tarp between the stored and deployed positions, in some embodiments, the enclosure system further includes an actuating handle that is connected to a back end of the roller pipe and that is used to roll and unroll the roller pipe with the attached flexible tarp. For example, in certain embodiments, the actuating handle is configured to allow a user standing on the ground behind the combination trailer to rotate the end of the actuating handle nearest the user. Such rotation of the end of the actuating handle then translates to a rotation of the roller pipe and, as the roller pipe is manually rotated, the roller pipe, along with the flexible tarp, is moved from the stored position to the deployed position. In the deployed position, the actuating handle can then be stored along the exterior surface of the second side panel by handle brackets that are positioned on the lower wall section.

With further respect to the exemplary enclosure systems used in accordance with the combination trailers of the present invention, in some embodiments, an enclosure system is provided that does not make use of an actuating handle to move the roller pipe and the flexible tarp over the open top of the dump trailer, but instead makes use of actuating arms connected to one or more electric motors for moving the roller pipe and flexible tarp. In particular, in some embodiments, the actuating handle is replaced by a front actuating arm and a back actuating arm with each of the arms connected to an electric motor. In such embodiments, the front actuating arm has a first end that is connected to the exterior surface of the front portion of the dump trailer, and a second end that is connected to a front end of the roller pipe. Similarly, the back actuating arm has a first end that is connected to the exterior surface of the back portion, and a second end that is connected to a back end of the roller pipe. In this regard, by connecting the roller pipe to the second ends of the actuating arms, the roller pipe can be moved from the stored position near the first side panel to the deployed position near the second side panel and, consequently, be used to unroll the flexible tarp over the open top of the dump trailer.

Conversely, as the roller pipe is moved from the deployed position to the stored position via the movement of the front actuating arm and the back actuating arm from adjacent to the second side panel toward the first side panel, the electric motors can be used to rotate the roller pipe and wind the flexible tarp around the roller pipe and uncover the open top of the dump trailer. In some embodiments, to accommodate the use of such front and back actuating arms, the front portion of an exemplary dump trailer includes a first fixed bulkhead and a second fixed bulkhead that are arranged parallel to and spaced at a predetermined distance from one another to define a cavity. Such a cavity can then be used to house the actuator cylinder and linkage that is used to move the upper wall section of an exemplary combination trailer between the open and closed position.

An exemplary combination trailer of the present invention can further include a number of other features that are positioned in the interior of the dump trailer. For example, in some embodiments, the dump trailer is equipped with a pair of internal rails that are positioned on the bottom surface of the dump trailer. The internal rails are connected to the first and second side panels by a plurality of posts, where each of the posts is spaced at a predetermined distance from adjacent posts. In some embodiments, the dump trailer further includes an adjustable bulkhead for securing a load in the dump trailer, where the adjustable bulkhead includes a center panel that is secured between two opposing side members. In these embodiments, the opposing side members have a hooked bottom portion such that the hooked bottom portions can be slidably disposed over the posts connecting the internal rails to the first and second side panels and the adjustable bulkhead can be positioned at a desired location in the dump trailer to secure a load of commodities.

Further features and advantages of the present invention will become evident to those of ordinary skill in the art after a study of the description, figures, and non-limiting examples in this document.

DESCRIPTION OF EXEMPLARY EMBODIMENTS

The present invention is a combination trailer. In particular, the present invention is a combination trailer that includes a dump trailer and an enclosure system, where the dump trailer includes an upper wall section that is movable between a lowered, open position and a raised, closed position to facilitate the loading and unloading of various commodities.

Figure 1:
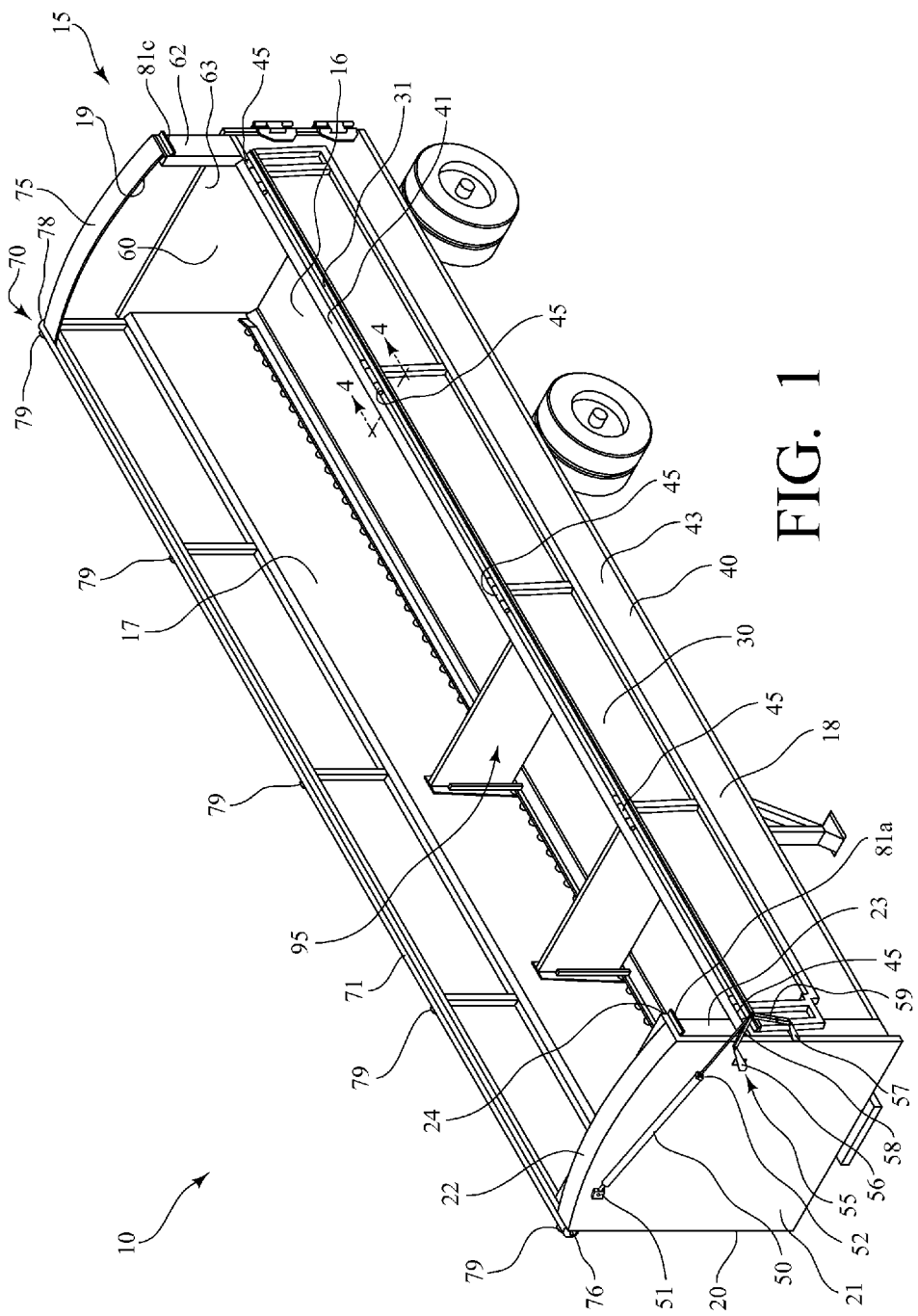
FIG. 1 is a perspective view of an exemplary combination trailer made in accordance with the present invention with an upper wall section of a second side panel in an open position and an enclosure system in a stored position adjacent to a first side panel.
Figure 2:
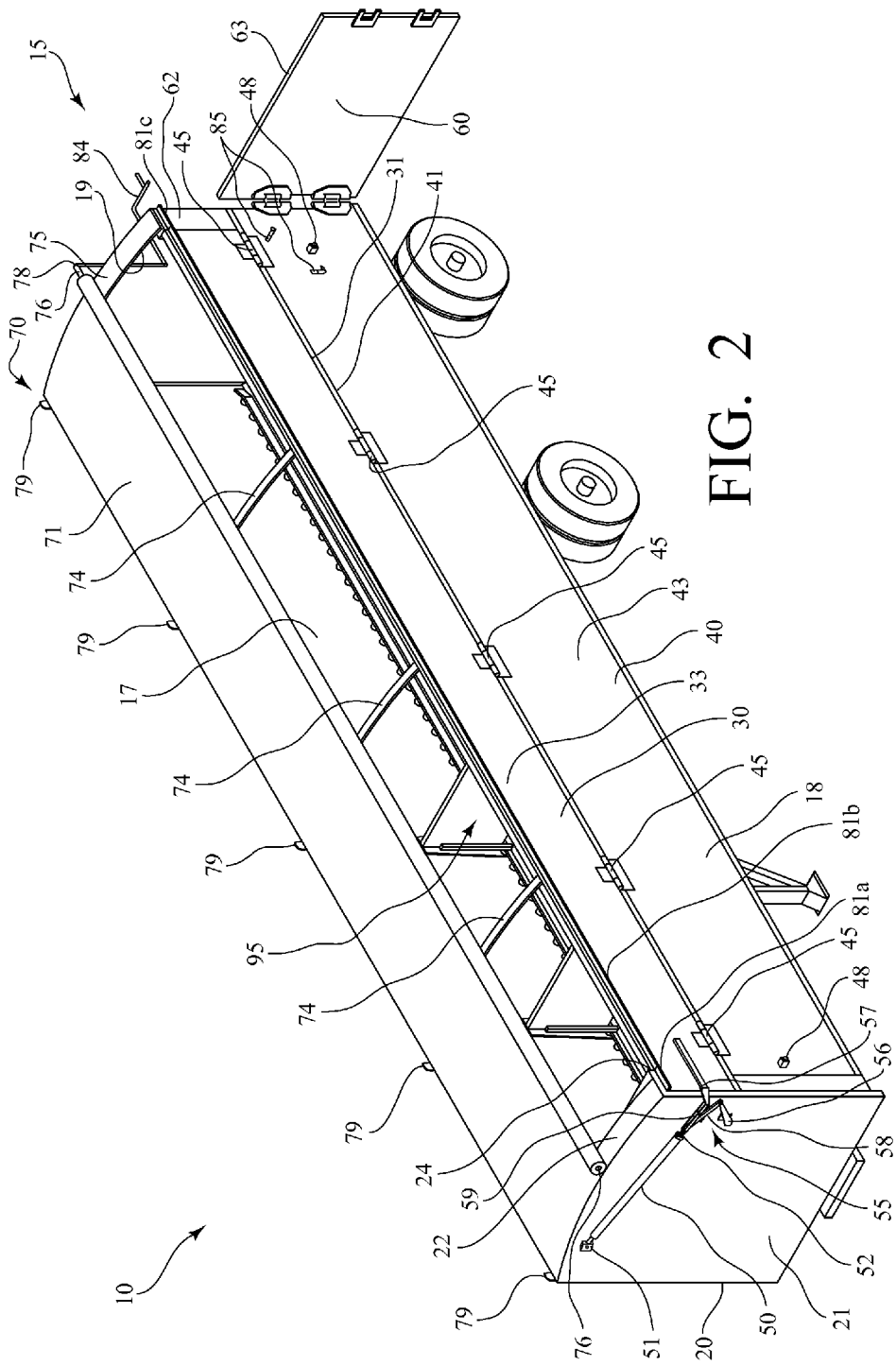
FIG. 2 is another perspective view of the exemplary combination trailer shown in FIG. 1, but with the upper wall section in a closed position and the enclosure system in a partially deployed position over the open top of the dump trailer.
Figure 3:
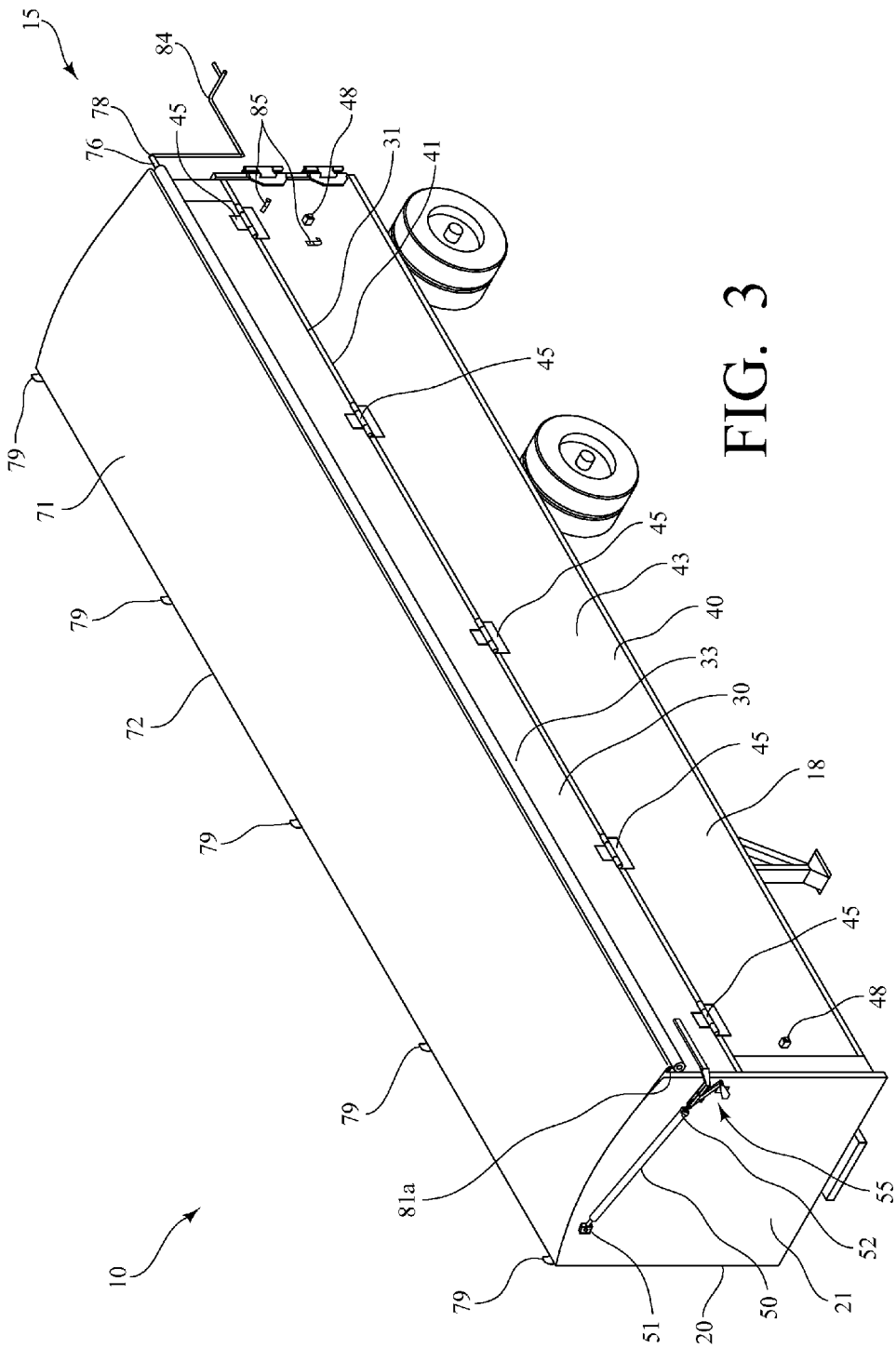
FIG. 3 is another perspective view of the exemplary combination trailer shown in FIG. 1, but showing the upper wall section in the closed position and the enclosure system in a fully-deployed position over the open top of the dump trailer.

Referring first to FIGS. 1-3, an exemplary combination trailer 10 made in accordance with the present invention includes a dump trailer 15 having a bottom surface 16, a first side panel 17, a second side panel 18 opposite the first side panel 17, a front portion 20, a back portion 60 opposite the front portion 20, and an open top 19. The height of the first side panel 17, the height of the second side panel 18, and the height of the front portion 20 are all substantially equal to one another, with the exception that the front portion 20 further includes a curved top end 22 which is matched in height and shape by a curved support bow 75 that is attached to the back portion 60, as described in further detail below. Furthermore, the combination trailer 10 includes an enclosure system 70 that is adapted to selectively cover the open top 19 of the dump trailer 15.

As shown in FIGS. 1-3, the second side panel 18 of the dump trailer 15 includes an upper wall section 30 and a lower wall section 40. The upper wall section 30 and lower wall section 40 are pivotally connected to one another by a plurality of hinges 45 along the length of the dump trailer 15 such that the upper wall section 30 can rotate approximately 180 degrees between a lowered, open position, as best shown in FIG. 1, to a raised, closed position, as best shown in FIG. 2. In the open position, the upper wall section thus rests against the lower wall section 40 along the length of the second side panel 18 of the dump trailer 15. In this regard, a plurality of stoppers 48 are connected to the exterior surface 43 of the lower wall section 40, such that the upper wall section 30 rests against the stoppers 48 in the open position. Typically, the stoppers 48 are comprised of rubber or another sufficiently soft but durable material that allows the stoppers 48 to prevent the lower wall section 40 and the upper wall section 30 from colliding with each other and potentially damaging each other during use of the dump trailer 15.

With further respect to the upper wall section 30, in the dump trailer 15, the height of the upper wall section 30 is about one-third of the height of the entire second side panel 18 and the height of the lower wall section 40 is about two-thirds the height of the entire second side panel 18. In this regard, the second side panel 18 and, in particular, the upper wall section 30 and the lower wall section 40, are configured to not only have a height that is substantially equal to the height of the first side panel 17 and the front portion 20 of the dump trailer 15 when the upper wall section 30 is in the closed position, but the upper wall section 30 also has a height that allows the height of the second side panel 18 to be sufficiently reduced and various commodities loaded into the dump trailer 15 over the second side panel 18 when the upper wall section 30 is moved into the open position. Of course, it is contemplated that the height of an upper wall section and a lower wall section in an exemplary combination trailer may also be further varied to accommodate different loading requirements or for different applications. For instance, it is contemplated than an exemplary combination trailer can be manufactured having an upper wall section and a lower wall sections that are each about one-half of the height of an entire second side panel or that are about two-thirds and one-third the height, respectively, of an entire second side panel. Moreover, it is contemplated that an upper wall section and a lower wall section of an exemplary combination trailer can comprise only a part of a second side panel, such as a front part, a back part, or a middle part of a second side panel without departing from the scope and spirit of the invention.

Regardless of the heights of the upper wall section 30 and the lower wall section 40, the front portion 20 and the back portion 60 of the dump trailer 15 also include sealing surfaces 23, 62 for sealing the upper wall section 30 against the front portion 20 and the back portion 60 of the dump trailer 15 when the upper wall section 30 is in the closed position. The sealing surfaces 23, 62 generally include one or more rubber seals and extend along the front portion 20 and the back portion 60 adjacent to the second side panel 18 from just above the lower wall section 40 to a height that is substantially equal to the height of the upper wall section 30 in the closed position, such that the upper wall section 30 is fully sealed against the front portion 20 and the back portion 60 when the upper wall section 30 is in the closed position. Further included on the front portion 20 is an overhang 24 that is positioned above the sealing surface 23 such that, when the upper wall section 30 is in the closed position, the overhang 24 extends over the upper wall section 30. In this regard, in operation, as the upper wall section 30 is moved into the closed position and presses against and engages the sealing surface 23, the upper wall section 30 passes beneath the overhang 24, and the overhang 24 and the sealing surface 23 thereby help to prevent precipitation or debris from entering the dump trailer 15 during use.

To facilitate the movement of the upper wall section 30 between the open position and the closed position, the combination trailer 10 further includes an actuator in the form of a pneumatic cylinder 50 that is operably connected to the upper wall section 30 and the front portion 20 by a linkage 55. More specifically, and referring still to FIGS. 1-3, a first end 51 of the pneumatic cylinder 50 is connected to the exterior surface 21 of the front portion 20 through use of a cylinder mount, and the linkage 55 connects both the exterior surface 21 of the front portion 20 and the exterior surface 33 of the upper wall section 30 to a second end 52 of the pneumatic cylinder 50. By using such a pneumatic cylinder 50, when the pneumatic cylinder 50 is fully extended, as shown best in FIG. 1, the upper wall section 30 can be held in an open position and, when the pneumatic cylinder 50 is fully retracted, as shown best in FIG. 2, the upper wall section 30 can thus be held in the closed position. Of course, various other actuators for moving the upper wall section 30 between the open position and the closed position, such as a hydraulic cylinders, rotary actuators, and the like can also be used without departing from the spirit and scope of the subject matter described herein.

With respect to the linkage 55 that connects both the front portion 20 and the upper wall section 30 to the second end 52 of the pneumatic cylinder 50, the linkage 55 is comprised of a first pivot mount 56 that is fixedly connected to the exterior surface 21 of the front portion 20 and a second pivot mount 57 that is fixedly connected to the exterior surface 33 of the upper wall section 30. The linkage further includes a first pivoting member 58 that connects the second end 52 of the pneumatic cylinder 50 to the first pivot mount 56 through two pin joints, one located on each end of the first pivoting member 58. A second pivoting member 59 of the linkage 55 then connects the second end 52 of the pneumatic cylinder 50 to the second pivot mount 57 through two pin joints, one located on each end of the second pivoting member 59. Such an arrangement allows the first pivoting member 58 to rotate in relation to the second end 52 of the pneumatic cylinder 50, and the first pivoting member 58 to rotate in relation to the first pivot mount 56. Similarly, the arrangement allows the second pivoting member 59 to rotate in relation to the second end 52 of the pneumatic cylinder 50, and the second pivoting member 59 to rotate in relation to the second pivot mount 57.

In operation, when the upper wall section 30 is to be moved from the open position to the closed position, a user first causes the pneumatic cylinder 50 to begin moving from the fully extended position to the fully retracted position. As the second end 52 of the pneumatic cylinder 50 moves from the fully extended position, the second end 52 retracts towards the first end 51 of the pneumatic cylinder 50 and decreases the overall length of the pneumatic cylinder 50, while also pulling the first pivoting member 58 and the second pivoting member 59 toward the first end 51 of the pneumatic cylinder. The first pivoting member 58 and the second pivoting member 59 then consequently begin to pull the first pivot mount 56 and the second pivot mount 57. However, during this operation, the first pivot mount 56, which is affixed to the exterior surface 21 of the front portion 20, remains stationary and causes a rotation of the first and second pivoting members 58, 59 as well as the pneumatic cylinder 50, whose first end 51 is configured to rotate relative to the front portion 20 of the dump trailer. The pull of the second end 52 of the pneumatic cylinder 50 is thus transferred through the second pivoting member 59 to the second pivot mount 57, which in turn causes the upper wall section 30 to rotate into the closed position.

Figure 4:
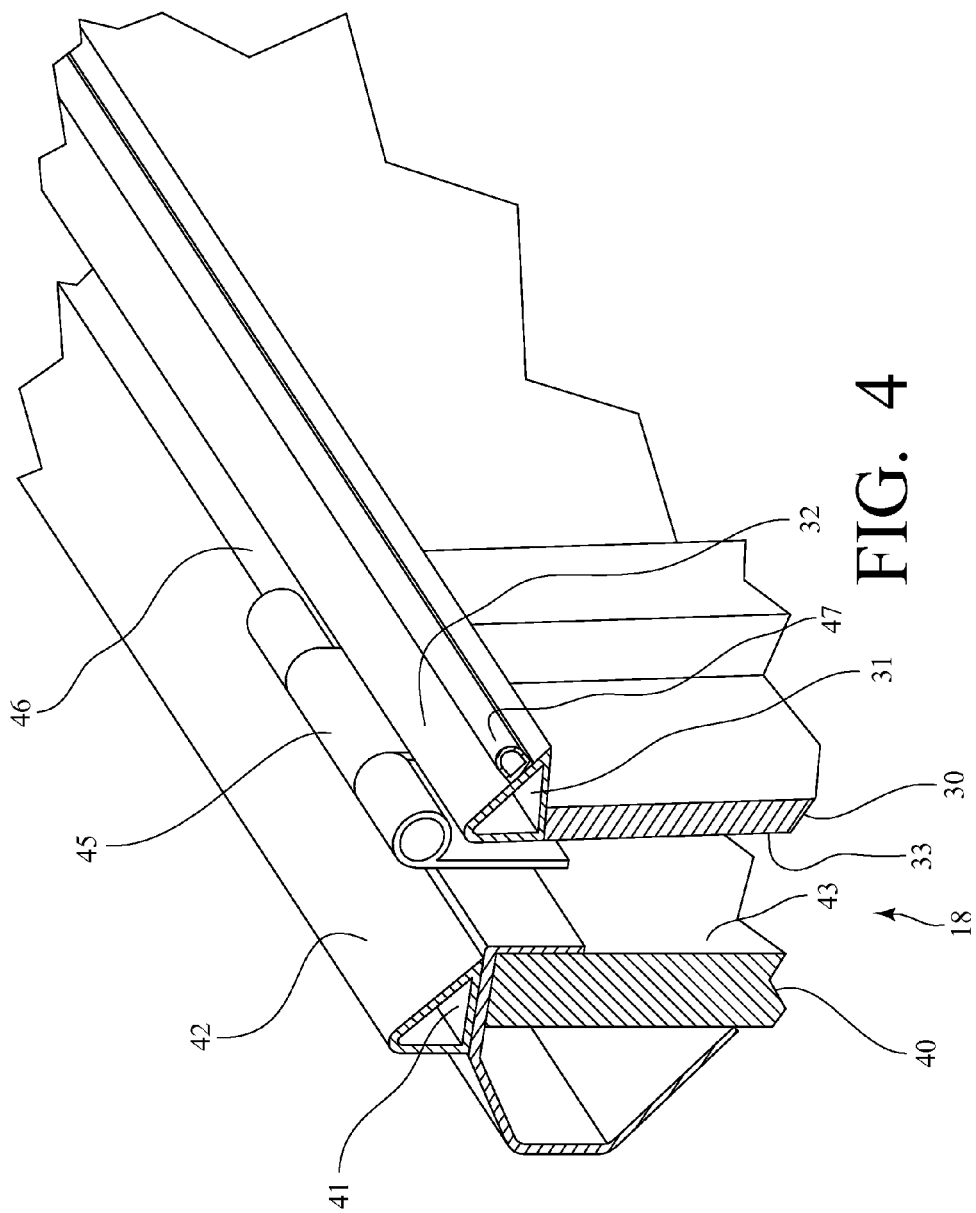
FIG. 4 is a partial sectional view of the exemplary combination trailer of FIG. 1 taken along line 4-4 of FIG. 1, and showing the upper wall section in an open position and connected to a lower wall section by a hinge.

With further respect to the upper wall section 30 of the combination trailer 10, as indicated above, the upper wall section 30 is pivotally connected to the lower wall section 40 by a plurality of hinges 45. As best shown in FIG. 4, each hinge 45 is connected to the exterior surface 33 of the upper wall section 30 adjacent to a bottom edge 31 of the upper wall section 30, and to the exterior surface 43 of the lower wall section 40 adjacent to a top edge 41 of the lower wall section 40. By positioning and connecting the hinges to the upper wall section 30 and the lower wall section 40 in such a manner, when the upper wall section 30 is in the open position, the placement of the hinge 45 causes the upper wall section 30 and the lower wall section 40 to define a gap 46 that helps to prevent smaller pieces of bulk commodities, such as sand, coal, and coke, from becoming trapped between the upper wall section 30 and the lower wall section 40 and preventing the upper wall section 30 from being moved into the closed position.

To further prevent such a trapping of particles, the bottom edge 31 of the upper wall section 30 has a first sloped surface 32 which extends along the entire length of the upper wall section 30, and the top edge 41 of the lower wall section 40 has a second sloped surface 42 which extends along the entire length of the lower wall section 40. As shown in FIG. 4, the first sloped surface 32 and the second sloped surface 42 are angled such that, when the upper wall section 30 is in the open position, both of the sloped surfaces 32, 42 slope downwardly away from the first side panel 17 (i.e., downwardly left to right in FIG. 4). In operation, when the upper wall section 30 is in the open position, the sloped surfaces 32, 42 and the gap 46 thus function together to direct bulk commodities loaded onto the dump trailer 15 to either collect in the interior of the dump trailer 15 or fall away from the dump trailer 15 and onto the ground. In other words, the gap 46 and the sloped surfaces 32, 42 help to ensure that any bulk commodities do not remain on the bottom edge 31 or the top edge 41, but are instead either directed away from the gap 46 and fall to the ground outside of the dump trailer 15 or are directed towards the gap 46, through which the bulk commodities are then allowed to pass and fall to the ground outside of the dump trailer 15. In this exemplary embodiment, by including the sloped surfaces 32, 42 to prevent the accumulation of bulk commodities along the bottom edge 31 of the upper wall section 30 and the top edge 41 of the lower wall section 40, a seal 47 (e.g., a rubber seal) extending along the entire length of the first sloped surface can then effectively be used to seal the upper wall section 30 to the lower wall section 40 to protect commodities from the elements or debris and prevent commodities from becoming lodged between the upper wall section 30 and the lower wall section 40 or from escaping the dump trailer 15 when the upper wall section 30 is in the closed position.

Referring again to FIGS. 1-3 and 5, to further obtain some of the benefits associated with both a traditional dump trailer and a flatbed trailer covered by an enclosure system, the back portion 60 of the dump trailer 15 further includes a tailgate 63 having a height that is substantially equal to the height of the lower wall section 40 of the dump trailer 15. The tailgate 63 is pivotally connected to at least one of the side panels 17, 18 such that the tailgate 63 can rotate outward and away from the combination trailer 10, as best shown in FIG. 2. Further included on the back portion 60 is a rear door cover 64 that extends from the enclosure system 70 and is removably connected to the top of the tailgate 63. The rear door cover 62 may be connected to the tailgate 63 by a strap or other similar fastening means, as would be recognized by those of ordinary skill in the art, but is typically comprised of a flexible material to allow the rear door cover 62 to be easily manipulated and, if necessary, secured in a rolled-up position with a strap or other similar fastening means to provide access to the interior of the dump trailer 15. Of course, it is also contemplated that a rear door cover need not be included on an exemplary combination trailer at all, and that an exemplary combination trailer can be provided having a tailgate that is pivotally connected to at least one of the side panels and that has a height that is substantially equal to the entire height of each of the side panels without departing from the spirit and scope of the subject matter described herein.

Figure 5:
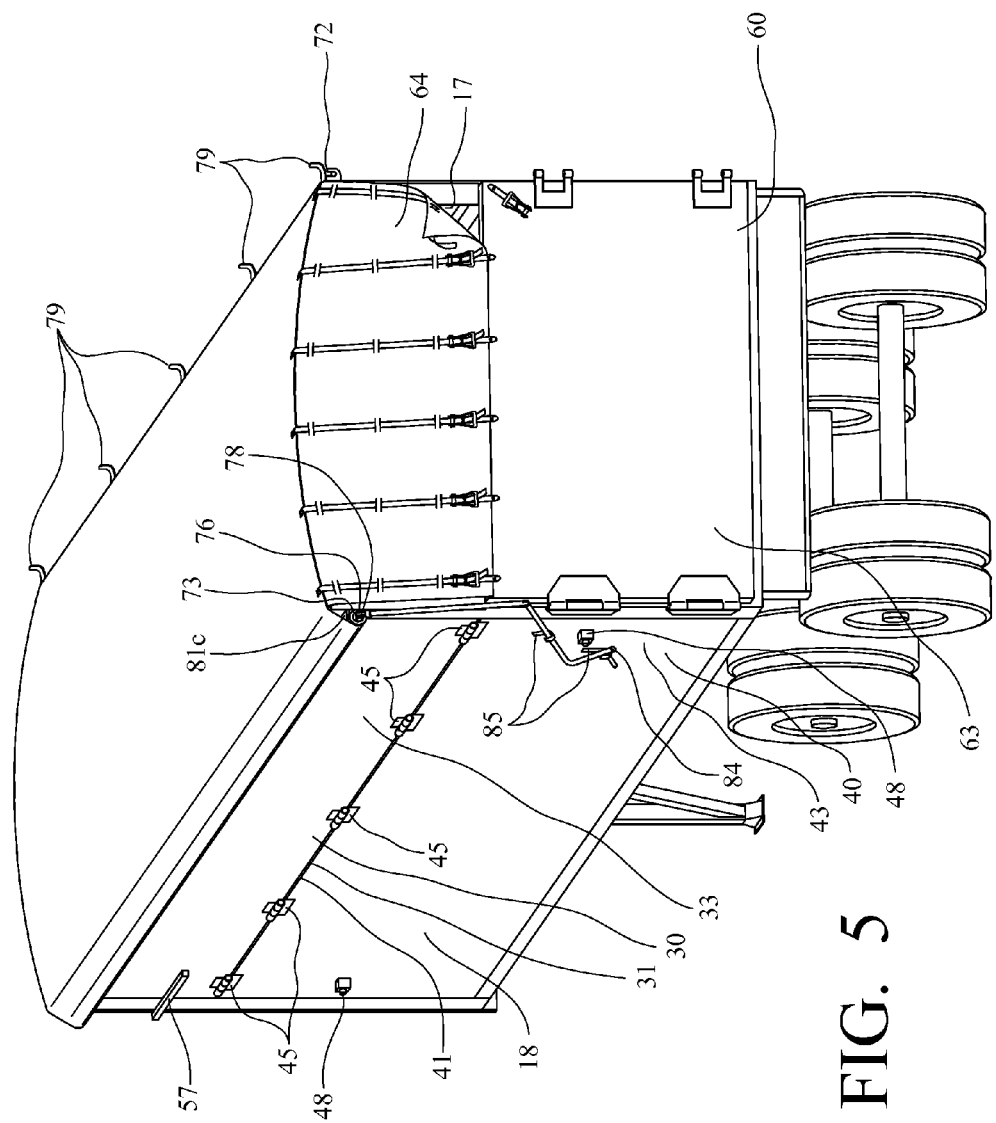
FIG. 5 is another perspective view of the exemplary combination trailer shown in FIG. 1, but showing the back portion of the trailer with an actuating handle stored on the side panel and with a rear door cover partially detached from the back portion.

Turning now to the enclosure system 70 included in the combination trailer 10, as indicated above, the enclosure system 70 is configured to selectively cover the open top 19 of the dump trailer 15. The enclosure system 70 is comprised of a flexible tarp 71, a roller pipe 76, a plurality of brackets 79 connected to the first side panel 17, and latching plates 81a, 81b, 81c. The flexible tarp 71 has a first edge 72 which extends along the length of the dump trailer 15, and a second edge 73 opposite the first edge 72 which also extends along the length of the dump trailer 15. The first edge 72 of the flexible tarp 71 is removably connected to the first side panel 17, while the second edge 73 of the flexible tarp 71 is connected to the roller pipe 76. The roller pipe 76 is movable between a stored position, as best shown in FIG. 1, and a deployed position, as best shown in FIGS. 3 and 5. Such an enclosure system can be described for example, with reference to the Roltec™ Side Locking Tarp system, which is manufactured and distributed by Agri-Cover Inc. of Jamestown, N. Dak., and which is commonly used to cover trailers having immovable walls. In this regard, when the roller pipe 76 is in the stored position as shown in FIG. 1, the majority of the flexible tarp 71 is wrapped around the roller pipe 76 with only the first edge 72 of the flexible tarp 71 not wrapped around the roller pipe 76 as it is connected to the first side panel 17. As shown in FIGS. 2, 3 and 5, however, when the roller pipe 76 is unrolled and deployed, the flexible tarp 71 extends from the first side panel 17 across the width of the dump trailer 15 to selectively cover the open top 19 of the dump trailer 15.

To support the flexible tarp 71 as it extends over the open top of the dump trailer, the combination trailer further includes a plurality of support members 74 that extend from the first side panel 17 to the upper wall section 30 when the upper wall section is in the closed position, as best shown in FIG. 2. In the exemplary combination trailer 10, the support members 74 are curved to match the curved top end 22 of the front portions 20. The support members 74 also include a back support bow 75 which is attached to the back portion 60 of the dump trailer 15 to provide adequate support for the flexible tarp 71 at the back portion 60. Of course, it is also contemplated that such a support bow could also be used adjacent to a front portion of the trailer in place of the curved top 22. Additionally, it is contemplated that the support members of an exemplary combination trailer can also assume a variety of other shapes depending on the particular configuration of the dump trailer being used and can be installed and removed from the dump trailer using means known to those skilled in the art, including, for example, vertical pegs for engaging slots or holes on the side panels and the like.

Once the flexible tarp is fully deployed over the open top of the trailer, the roller pipe 76 and, consequently, the flexible tarp 71 are then secured to dump trailer 15 by securing the roller pipe 76 and flexible tarp 71 beneath a front latching plate 81a connected to the front portion 20 of the dump trailer 15 adjacent to the second side panel 18, a middle latching plate 81b connected to the upper wall section 30, and a back latching plate 81c connected to the back portion 60 of the dump trailer 15 adjacent to the second side panel 18. The latching plates 81a, 81b, 81c are all substantially aligned when the upper wall section 30 is in the closed position, and thus, can effectively be used to connect the roller pipe 76 and the flexible tarp 71 to the dump trailer 15 adjacent to the second side panel 18 when the upper wall section 30 is in the closed position.

To move the roller pipe 76 and the flexible tarp 71 between the stored and deployed positions, the combination trailer 10 further comprises an actuating handle 84 that is connected to a back end 78 of the roller pipe 76. The actuating handle 84 is made of multiple members connected to each other by universal joints which allow flexibility in the position of the actuating handle 84. As such, in operation, the actuating handle 84 is configured to allow a user standing on the ground behind the combination trailer 10 to rotate the end of the actuating handle 84 opposite the back end 78 of the roller pipe 76. Such rotation then causes the opposite end of the actuating handle 84 to rotate the back end 78 of the roller pipe 76. As the roller pipe 76 is rotated, the roller pipe 76 moves from the stored position at the first side panel 17 across the open top 19 to the second side panel 18, unrolling the flexible tarp 71 along the way. The roller pipe 76 can then be connected to the latching plates 81a, 81b, 81c and secured in the deployed position, while the actuating handle 84 is subsequently stored along the second side panel 18 in handle brackets 85, as shown best in FIG. 5.

Returning the roller pipe 76 and the flexible tarp 71 from the deployed position to the stored position is accomplished in a similar manner. Specifically, the roller pipe 76 is first disconnected from the latching plates 81a, 81b, 81c, and rolled back to the first side panel 17 by use of the actuating handle 84. As the roller pipe 76 rotates, the flexible tarp 71 is wrapped around the roller pipe 76 until it reaches the first side panel 17. At that point, the roller pipe 76 and flexible tarp 71 can then simply rest in the plurality of brackets 79 to finish placement of the roller pipe 76 and flexible tarp 71 in the stored position. A matching set of handle brackets (not shown) located on the exterior surface of the first side panel 17 can then be used to store the actuating handle 84 when the roller pipe 76 is in the stored position.

Figure 7:
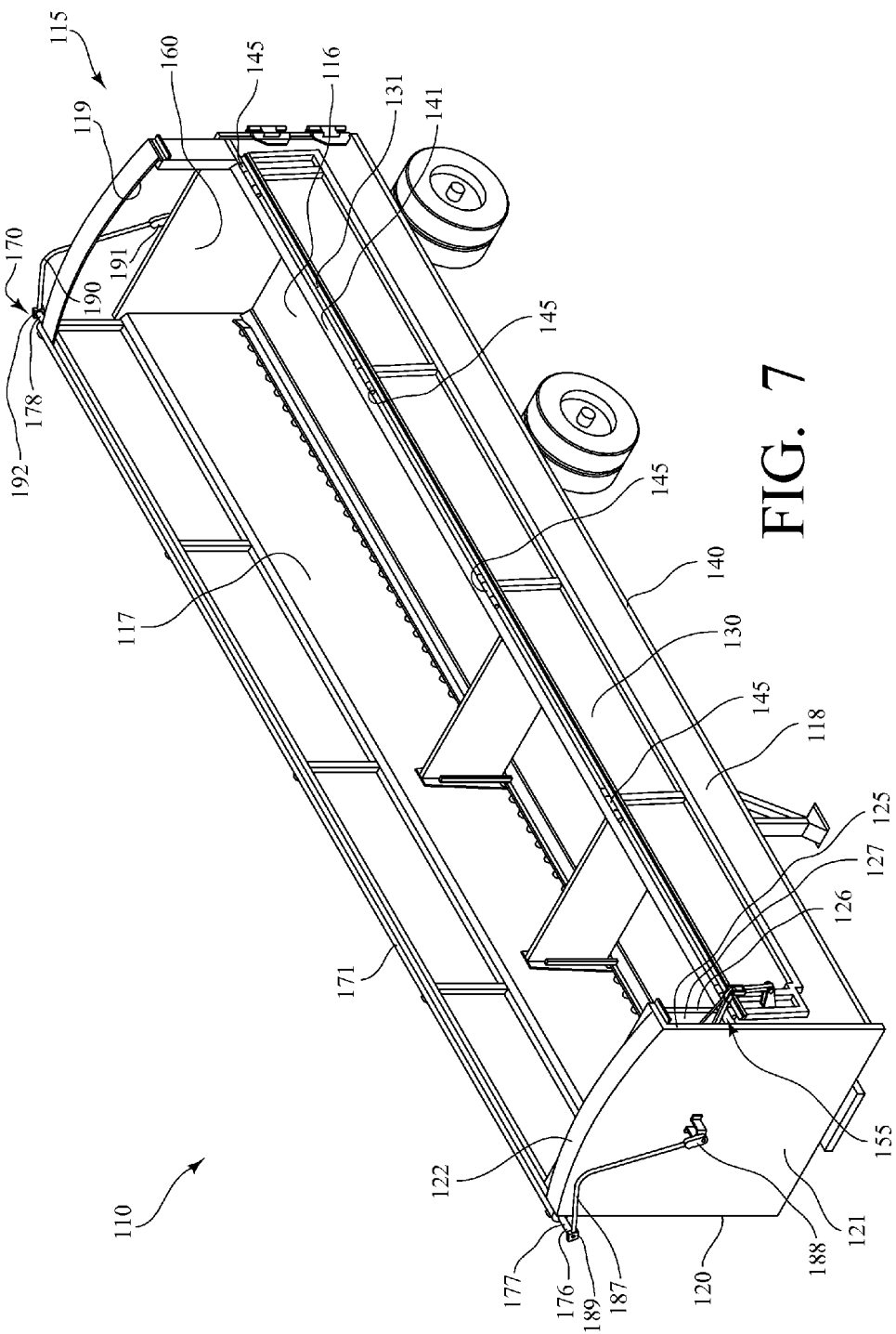
FIG. 7 is a perspective view of another exemplary combination trailer made in accordance with the present invention with an upper wall section of a second side panel in an open position and an enclosure system in a stored position adjacent to a first side panel.
Figure 8:
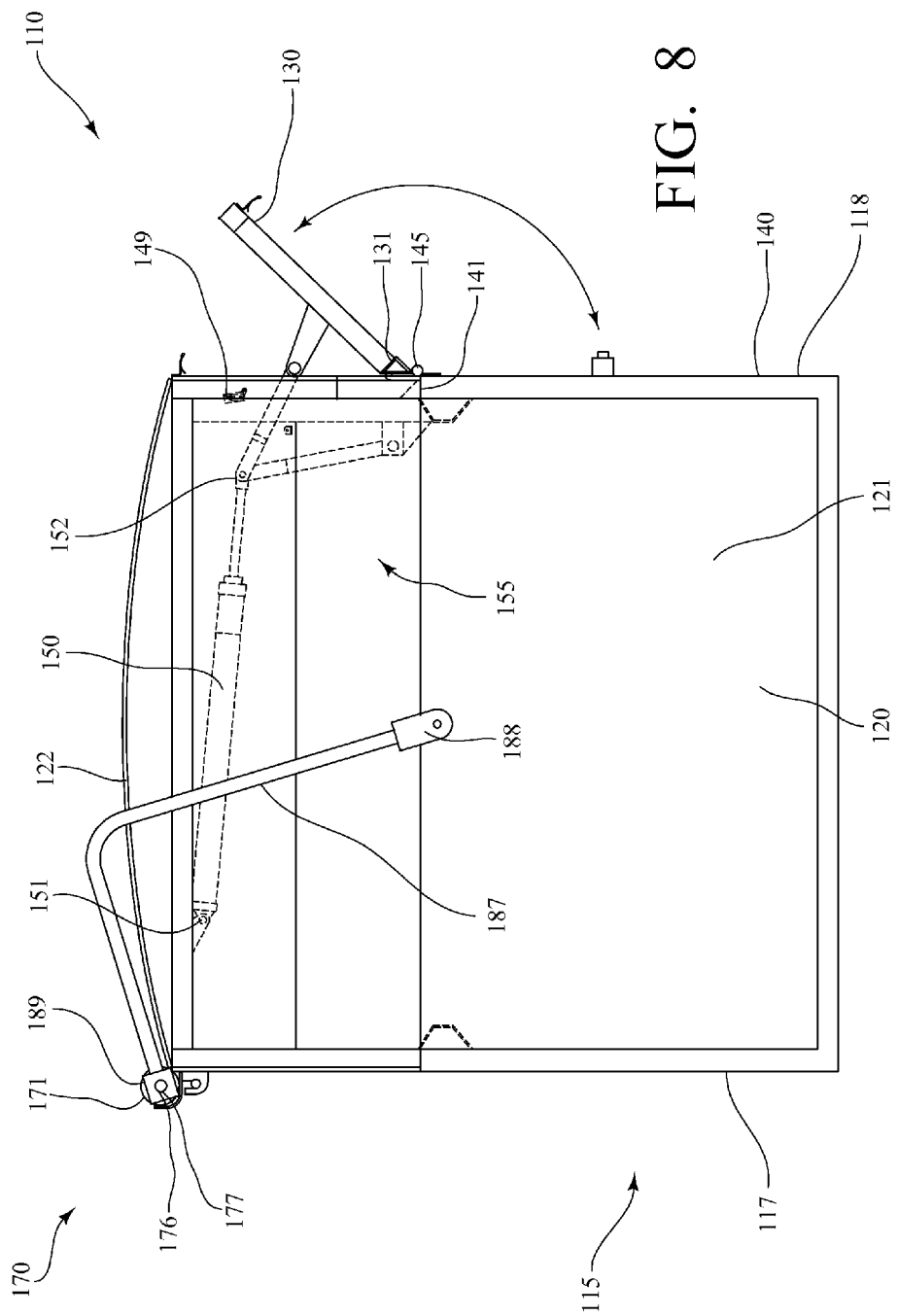
FIG. 8 is a front view of the exemplary combination trailer shown in FIG. 7, but with dashed lines showing a pneumatic cylinder and linkage housed within a cavity of the front portion of the combination trailer.

Referring now to FIGS. 7-8, in another exemplary embodiment of the present invention, a combination trailer 110 is provided that also includes a dump trailer 115 and an enclosure system 170 that is configured to selectively cover an open top 119 of the dump trailer 115. Similar to the combination trailer 10 shown in FIGS. 1-5, the dump trailer 115 of the combination trailer 110 includes a bottom surface 116, a first side panel 117, a second side panel 118 opposite the first side panel 117, a front portion 120, a back portion 160 opposite the front portion 120, and an open top 119. The front portion 120 further includes a curved top end 122. Furthermore, the second side panel 118 of the combination trailer 110 includes an upper wall section 130 having a bottom edge 131 and a lower wall section 140 having an top edge 141. Like the dump trailer 15, the upper wall section 130 and lower wall section 140 of the dump trailer 115 are also pivotally connected along the length of the dump trailer 115 by a plurality of hinges 145, such that the upper wall section 130 can rotate approximately 180 degrees from an open to a closed position.

Unlike the combination trailer 10 shown in FIGS. 1-3, however, the upper wall section 130 of the dump trailer is not moved between a closed and an open position by a pneumatic cylinder affixed to an exterior surface 121 of the front panel 120. Rather, in the combination trailer 110, a pneumatic cylinder 150 is used to move the upper wall section 130 between the open and closed position, but the pneumatic cylinder 150 is housed within the front portion 120 of the dump trailer 115. In the combination trailer 110, the front portion 120 includes a first fixed bulkhead 125 and a second fixed bulkhead 126 that are arranged in parallel and spaced at a predetermined distance from one another to define a cavity 127 for housing the pneumatic cylinder 150 and an associated linkage 155. In this regard, the first end 151 of the pneumatic cylinder 150 is affixed to an interior surface of the front portion 120 within the cavity 127, while the linkage 155 connects the interior surface of the front portion 120 and the interior surface of the upper wall section 130 to a second end 152 of the pneumatic cylinder 150, such that, when the pneumatic cylinder 150 is fully extended, the upper wall section 130 is held in the open position and, when the pneumatic cylinder 150 is retracted fully within the cavity 127, the upper wall section 130 is held in the closed position. Once the upper wall section 130 is placed in the closed position, the upper wall section can then be held in place by a latch 149, which is connected to the front portion 120 and is also located within the cavity 127.

Referring still to FIGS. 7-8, as indicated above, the combination trailer also includes an enclosure system 170 that selectively covers the open top 119 of the dump trailer 115. Like the enclosure system included in the combination trailer 10 shown in FIGS. 1-5, the enclosure system 170 is comprised of a flexible tarp 171 connected to the first side panel 117, and a roller pipe 176 that is movable from a stored position to a deployed position. Rather than use an actuating handle to move the roller pipe 176 and the flexible tarp from the stored position to the deployed position, however, the enclosure system 170 alternatively includes a front actuating arm 187 and a back actuating arm 190, that, although not shown in FIGS. 7-8, are each connected to an electric motor for rotating the roller pipe 176 and unrolling the flexible tarp 171 as the roller pipe 176 and the flexible tarp 171 are moved between the stored position and the deployed position. In particular, to move the roller pipe 176 and the flexible tarp 171 between the stored position and the deployed position, the front actuating arm 187 is spring-loaded and has a first end 188 that is connected to the exterior surface 121 of the front portion 120, and a second end 189 that is connected to a front end 177 of the roller pipe 176. Likewise, the back actuating arm 190 is spring-loaded and has a first end 191 that is connected to the exterior surface of the back portion 160, and a second end 192 that is connected to a back end 178 of the roller pipe 176. In this regard, the respective electric motors for each actuating arm 187, 190, engage and rotate the roller pipe 176 as the front actuating arm 187 and the back actuating arm 190 travel between the first side panel 117 and the second side panel 118. Consequently, the roller pipe 176, being connected to the second ends 189, 192 of the front and rear actuating arms 187, 190 then also moves along with the flexible tarp 171 between the stored position near the first side panel 117 and the deployed position near the second side panel 118. Such an enclosure system can be described for example, with reference to the SHUR-CO® 4500 Series HD tarp system, which is manufactured and distributed by SHUR-CO, LLC of Yankton, S. Dak., and which is commonly used to cover open-top trailers having immovable walls.

Figure 9:
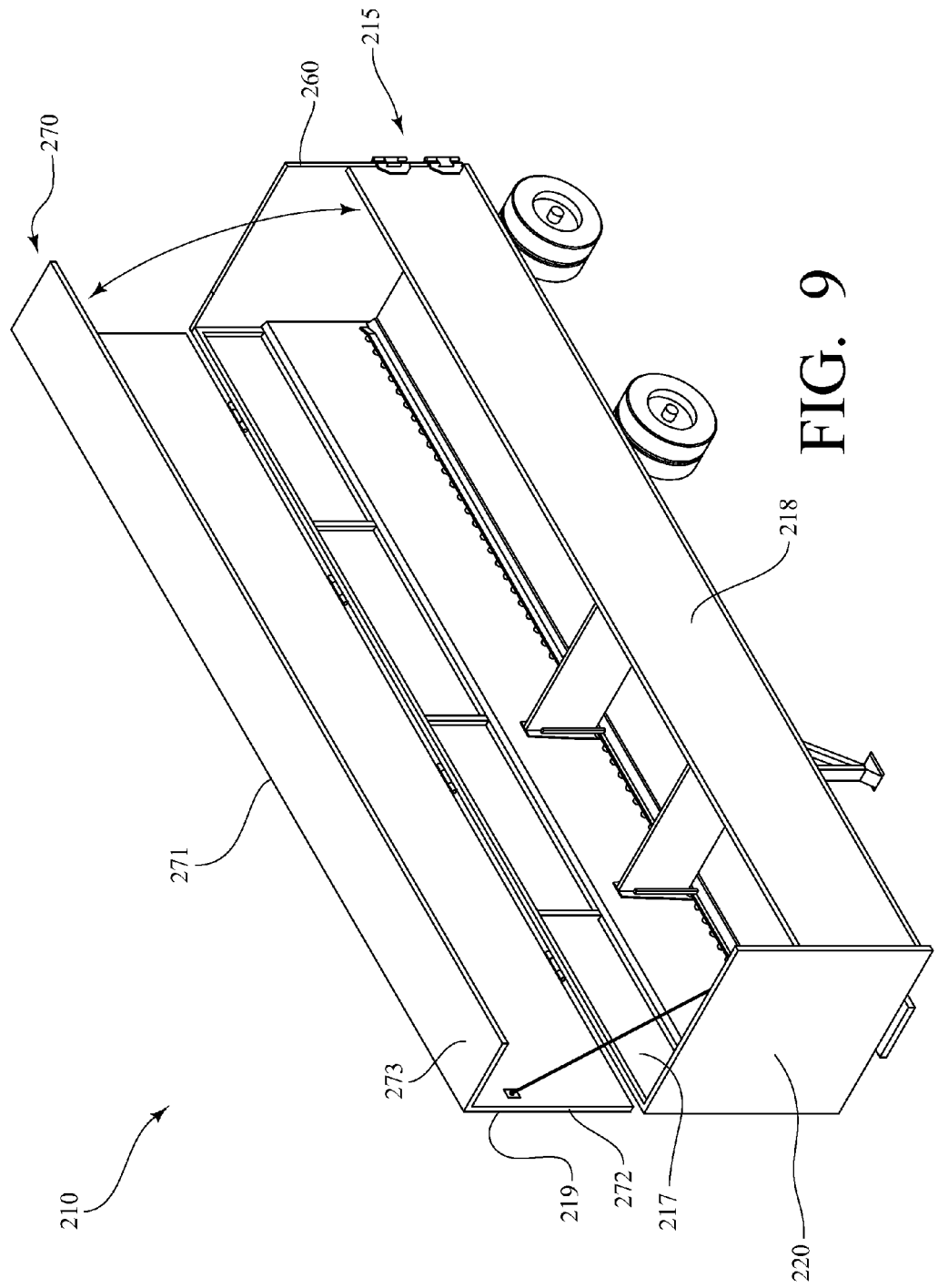
FIG. 9 is a perspective view of yet another exemplary combination trailer made in accordance with the present invention, and showing an alternative enclosure system in an open position.

As a refinement, and referring now to FIG. 9, in another exemplary embodiment of the present invention, a combination trailer 210 is provided that comprises a dump trailer 215 and an enclosure system 270 that is configured to selectively cover an open top 219 of the dump trailer 215. In this embodiment, the dump trailer 215 includes a front portion 220, a back portion 260, a first side panel 217, and a second side panel 218. Rather than using a flexible tarp to cover the open top 219 of the dump trailer 215, however, the dump trailer 215 makes use of a rigid cover 271 that is hinged to the first side panel 217 and can be rotated between and open and closed position. The cover 271 has a top portion 272 that is configured to be substantially horizontal in the closed position and extend generally from the first side panel 217 to the vertical plane of the second side panel 218. The cover 271 also has a side portion 273 that is configured to be substantially vertical in the closed position, and that has a length sufficient to meet and form a continuous surface with the shorter second side panel 218.

As further refinements, an exemplary combination trailer of the present invention can also include a number of features that are positioned in the interior of the dump trailer. For example, and referring again to FIGS. 1-2 and 6, the dump trailer 15 is also equipped with a pair of internal rails 93a, 93b that are positioned on the bottom surface 16 of the dump trailer 15. The internal rails 93a, 93b are connected to the first side panel 17 and the second side panel 18 by a plurality of posts 94, where each of the posts 94 are spaced at a predetermined distance from adjacent posts 94. By including the internal rails 93a, 93b in the dump trailer 10, the internal rails 93a, 93b not only provide protection for the first side panel 17 and the second side panel 18 when a load of bulk commodities is placed on the bottom surface 16 of the dump trailer 15, but the internal rails 93a, 93b also provide a means to secure a load 99 within the dump trailer 15.

Figure 6:
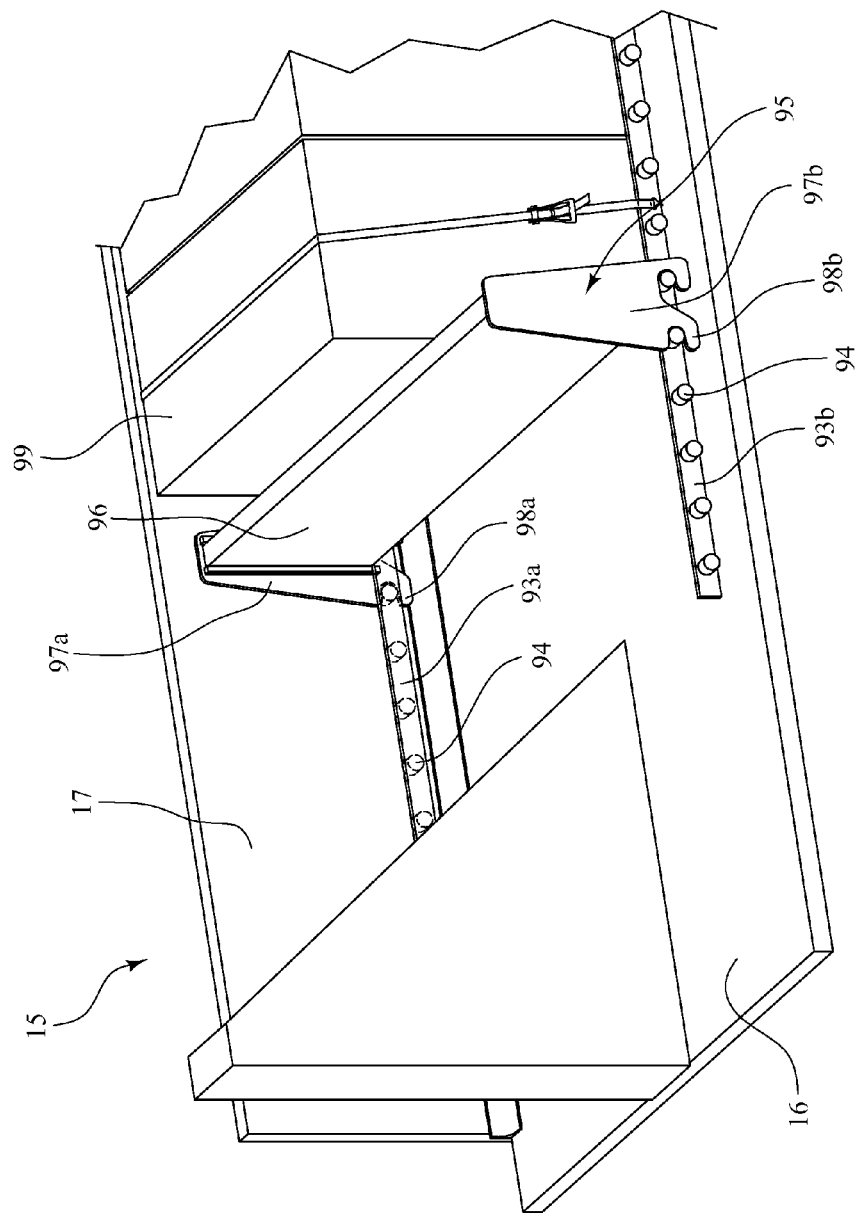
FIG. 6 is a partial perspective view of the exemplary combination trailer of FIG. 1, but with the front portion and second side panel of the combination trailer removed to show internal rails connected to the side panels by a plurality of posts and an adjustable bulkhead positioned in the trailer in front of a load.

As shown in FIG. 6, in one exemplary embodiment, the dump trailer 15 further includes an adjustable bulkhead 95 for securing a load 99 in the dump trailer 15. The adjustable bulkhead 95 includes a center panel 96 that is secured between two opposing side members 97a, 97b. The opposing side members 97a, 97b have hooked bottom portions 98a, 98b that can be slidably disposed over the posts 94 connecting the internal rails 93a, 93b to the first side panel 17 and the second side panel 18, such that the adjustable bulkhead 95 can be positioned at a desired location in the dump trailer 15 and used to secure a load 99. In some embodiments, the dump trailer 15 can further include a storage cabinet for storing the adjustable bulkhead 95 when it is not in use.

The above-described combination trailer, which includes a dump trailer with a movable wall section and an enclosure system, thus provides a greater deal of flexibility in transporting commodities as the combination trailer can advantageously be used to transport both bulk and general commodities. As such, the combination trailer is expected to reduce mileage incurred without transporting a load, reduce operating expenses, and reduce exhaust emissions, and will thus substantially lower shipping costs while providing faster service to an end user.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A combination trailer, comprising:
   a dump trailer having a bottom surface, a front portion, a back portion, a first side panel having a height substantially equal to the height of the front portion, and a second side panel having an upper wall section and a lower wall section, the upper wall section movable between an open position and a closed position; and an enclosure system configured to selectively cover an open top of the dump trailer, wherein the upper wall section includes a bottom edge and the lower wall section includes a top edge, and wherein the upper wall section and the lower wall section are pivotally connected to one another adjacent to the bottom edge of the upper wall section and the top edge of the lower wall section.

2. The combination trailer of claim 1, wherein the second side panel has a height that is substantially equal to the height of the front portion.

3. The combination trailer of claim 2, wherein the upper wall section has a height that is about one-third of the height of the second side panel, and wherein the lower wall section has a height that is about two-thirds of the height of the second side panel.

4. The combination trailer of claim 1, wherein the upper wall section is pivotally connected to the lower wall section by a plurality of hinges, each of the hinges positioned on the upper wall section and the lower wall section such that, when the upper wall section is in the open position, the upper wall section and the lower wall section define a gap between the upper wall section and the lower wall section.

5. The combination trailer of claim 4, wherein the bottom edge of the upper wall section has a first sloped surface and the top edge of the lower wall section has a second sloped surface, and wherein the first sloped surface and the second sloped surface are angled such that, when the upper wall section is in the open position, the first sloped surface and the second sloped surface each slope downwardly away from the first side panel.

6. The combination trailer of claim 1, further comprising a seal connected to the bottom edge of the upper wall section, the top edge of the lower wall section, or both.

7. The combination trailer of claim 1, further comprising an actuator operably connected to the front portion and the upper wall section, the actuator for moving the upper wall section between the open position and the closed position.

8. The combination trailer of claim 7, wherein a first end of the actuator is operably connected to the front portion and a second end of the actuator is operably connected to the upper wall section by a linkage, the linkage including:
a first pivot mount connected to the front portion;
a second pivot mount connected to the upper wall section;
a first pivoting member connected to the first pivot mount and the second end of the actuator; and
a second pivoting member connected to the second pivot mount and the second end of the actuator.

9. The combination trailer of claim 8, wherein the actuator is connected to an exterior surface of the front portion.

10. The combination trailer of claim 8, wherein the front portion includes a first fixed bulkhead and a second fixed bulkhead, the first and second fixed bulkheads arranged parallel to and spaced at a predetermined distance from one another, and the first and second fixed bulkheads defining a cavity for housing the actuator and the linkage.

11. The combination trailer of claim 1, further comprising a plurality of stoppers positioned on an exterior surface of the lower wall section such that the upper wall section rests against the stoppers when the upper wall section is in the open position.

12. The combination trailer of claim 1, further comprising a latch for securing the upper wall section in the closed position.

13. The combination trailer of claim 1, wherein the front portion includes a sealing surface for sealing the upper wall section against the front portion when the upper wall section is in the closed position.

14. The combination trailer of claim 1, wherein the front portion includes an overhang, the overhang positioned on the front portion such that, when the upper wall section is in the closed position, the overhang extends over the upper wall section.

15. The combination trailer of claim 1, wherein the back portion includes a tailgate pivotally connected to at least one of the side panels.

16. The combination trailer of claim 1, wherein the back portion further includes a rear door cover.

17. The combination trailer of claim 1, wherein the enclosure system comprises:
a flexible tarp having a first edge and a second edge opposite the first edge, the first edge connected to the first side panel, and the first edge and the second edge of the flexible tarp each having a length such that the flexible tarp is configured to extend along the length of the dump trailer;
a roller pipe connected to the second edge of the flexible tarp, the roller pipe movable between a stored position and a deployed position;
a plurality of brackets connected to the first side panel, the brackets for holding the roller pipe in the stored position; and
one or more latching plates for connecting the roller pipe to the dump trailer adjacent to the second side panel when the roller pipe is in the deployed position.

18. The combination trailer of claim 17, wherein the one or more latching plates include:
a front latching plate affixed to the front portion of the dump trailer adjacent to the second side panel;
a middle latching plate affixed to the upper wall section of the second side panel; and
a back latching plate affixed to the back portion of the dump trailer adjacent to the second side panel.

19. The combination trailer of claim 17, wherein the enclosure system further comprises a plurality of support members, each support member extending from the first side panel to the upper wall section when the upper wall section is in the closed position.

20. The combination trailer of claim 19, wherein the plurality of support members includes a support bow attached to the back portion.

21. The combination trailer of claim 17, wherein the enclosure system further comprises an actuating handle connected to a back end of the roller pipe, the actuating handle for moving the roller pipe between the stored and deployed positions.

22. The combination trailer of claim 17, wherein the enclosure system further comprises a front actuating arm having a first end and a second end, the first end of the actuating arm connected to an exterior surface of the front portion, and the second end of the actuating arm connected to a front end of the roller pipe.

23. The combination trailer of claim 22, wherein the enclosure system further includes a back actuating arm having a first end and a second end, the first end of the back actuating arm connected to an exterior surface of the back portion, and the second end connected to a back end of the roller pipe.

24. The combination trailer of claim 1, wherein the dump trailer further comprises a pair of internal rails positioned on the bottom surface of the dump trailer and connected to the first and second side panels by a plurality of posts.

25. The combination trailer of claim 24, further comprising an adjustable bulkhead for securing a load in the dump trailer, the adjustable bulkhead including a center panel secured between two opposing side members, the side members having a hooked bottom portion configured to be slidably disposed over the posts such that the adjustable bulkhead can be positioned at a desired location in the dump trailer.

26. A combination trailer, comprising:
- a dump trailer having a bottom surface, a front portion, a back portion, a first side panel having a height substantially equal to the height of the front portion, and a second side panel having an upper wall section and a lower wall section, the upper wall section movable between an open position and a closed position; and
- an enclosure system configured to selectively cover an open top of the dump trailer, the enclosure system including,
  - a flexible tarp having a first edge and a second edge opposite the first edge, the first edge connected to the first side panel, and the first edge and the second edge of the flexible tarp each having a length such that the flexible tarp is configured to extend along the length of the dump trailer, and
  - a roller pipe connected to the second edge of the flexible tarp, the roller pipe movable between a stored position and a deployed position.

* * * * *